(12) United States Patent
Dalal

(10) Patent No.: US 6,321,093 B1
(45) Date of Patent: Nov. 20, 2001

(54) SYSTEM AND METHOD FOR CONTROLLING PRIORITY CALLS IN A WIRELESS NETWORK

(75) Inventor: Neerav N. Dalal, Plano, TX (US)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/362,835

(22) Filed: Jul. 28, 1999

Related U.S. Application Data

(60) Provisional application No. 60/095,970, filed on Aug. 7, 1998.

(51) Int. Cl.⁷ .................................................. H04Q 7/00
(52) U.S. Cl. ........................................... 455/512; 455/514
(58) Field of Search ..................... 455/450, 452, 455/453, 509, 510, 512, 513, 514, 515, 516

(56) References Cited

U.S. PATENT DOCUMENTS

| | | | |
|---|---|---|---|
| Re. 32,789 | * | 11/1988 | Lynk, Jr. et al. ............... 455/514 |
| 4,442,426 | * | 4/1984 | Heuschmann et al. . |
| 5,006,983 | * | 4/1991 | Wayne et al. . |
| 5,463,617 | * | 10/1995 | Grube et al. . |
| 5,471,469 | * | 11/1995 | Flammer, III et al. . |
| 5,519,763 | * | 5/1996 | Namekawa et al. . |
| 5,524,185 | * | 6/1996 | Na . |
| 5,539,923 | * | 7/1996 | Matsumoto . |
| 5,586,122 | * | 12/1996 | Suzuki et al. . |
| 5,606,595 | * | 2/1997 | Ejzak . |
| 5,666,655 | * | 9/1997 | Ishikawa et al. ............... 455/512 |
| 5,758,291 | * | 5/1998 | Grube et al. . |
| 5,761,500 | * | 6/1998 | Gallant et al. . |
| 5,781,862 | * | 7/1998 | Da Silva et al. . |
| 6,138,031 | * | 10/2000 | Sillanpaa et al. ............... 455/512 |

* cited by examiner

*Primary Examiner*—Thanh Cong Le
(74) *Attorney, Agent, or Firm*—John C. Han

(57) ABSTRACT

There is disclosed a wireless communications network in which a group of base stations are served by a mobile switching center that maintains a master data record for all missed calls from mobile devices in all base station coverage areas. Missed call data are stored in different priority level queues in each of the bases stations. When a call is missed in a first base station coverage area, a time stamp or a sequence number for the missed call is stored in the mobile switching center. If the mobile device moves into a second base station coverage area, the mobile device re-originates the missed call. The second base station receives from the mobile switching center the priority level of the re-originated call and the time stamp or unique sequence number from the mobile switching center. If the second base station does not have a traffic channel available, the second base station puts the missed call in the proper priority level queue and, within that proper priority level queue, can use the time stamp or the sequence number to determine the priority of the missed call relative to the pre-existing missed calls already in the priority level queue.

20 Claims, 3 Drawing Sheets

SYSTEM AND METHOD FOR CONTROLLING PRIORITY CALLS IN A WIRELESS NETWORK

CROSS-REFERENCE TO RELATED APPLICATIONS

The present invention is related to that disclosed in U. S. Provisional Patent Application No. 60/095,970, filed on Aug. 7, 1998, entitled "SYSTEM AND METHOD FOR CONTROLLING PRIORITY CALLS IN A WIRELESS NETWORK," which is commonly assigned to the assignee of the present invention. The disclosure of this related provisional patent application is incorporated herein by reference for all purposes as if fully set forth herein.

TECHNICAL FIELD OF THE INVENTION

The present invention is directed, in general, to wireless communication networks and, more specifically, to a system for controlling priority calls in a wireless network.

BACKGROUND OF THE INVENTION

In 1996, more than 75 million people worldwide used cellular telephones. Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

Wireless subscribers use a wide variety of wireless devices, including cellular phones, personal communication services (PCS) devices, and wireless modem-equipped personal computer (PCs), among others. The large number of subscribers and the many applications for wireless communications have increased wireless traffic to the point that communication channels are frequently unavailable when a subscriber attempts to initiate a call in a wireless communication system.

When a subscriber is unable to access a channel when the subscriber initiates a call, the wireless system may "reserve" the next available channel for the missed call and then initiate a return call to the subscriber's device when the channel is finally available. In such a system, the wireless system may also assign a priority level to each missed call in order to service higher priority calls first. For example, 911 calls (emergency calls) may be assigned the highest priority and premium subscribers who pay a higher service fee may be assigned a higher priority level than regular subscribers who pay the standard service fee. Calls having a higher priority level are served before lower priority level calls when the next channel comes available. As between two calls having the same priority level, the calls are served in the order received (i.e., chronological) when the next channel comes available. However, if a subscriber moves from one base station coverage area to another, there is no way to maintain the original priority level of that subscriber's missed call with respect to the pending missed calls in the new coverage area.

There is therefore a need in the art for a wireless communication system that is able to maintain the proper priority level of a missed call in a new coverage area when a subscriber moves from a first coverage area in which the call was missed to a new coverage area. In particular, there is a need in the art for an improved wireless communication system that tracks the priority levels of all missed calls in a plurality of base station coverage areas and which maintains priority levels of missed calls on a system-wide basis, rather than within individual base station coverage areas.

SUMMARY OF THE INVENTION

To overcome the above-described shortcomings of the prior art, there is disclosed a wireless communications network in which a group of base stations are served by a mobile switching center that maintains a master data record for all missed calls from mobile devices in all of the base station coverage areas. Missed call data are stored in different priority level queues in each of the bases stations. When a call is missed in a first base station coverage area, a time stamp for the missed call is stored in the mobile switching center. Alternatively, the mobile switching center can store a sequential number associated with each missed call without regard to the base station from which it is received. In this manner, each missed call has a unique sequence number assigned to it.

If the mobile device moves into a second base station coverage area, the mobile device re-originates the missed call. The second base station receives from the mobile switching center the priority level of the call re-originated by the mobile device and retrieves the time stamp or unique sequence number from the mobile switching center. If the second base station does not have a traffic channel available, the second base station can put the missed call in the proper priority level queue and, within that proper priority level queue, can determine the priority of the missed call relative to the pre-existing missed calls already in the priority level queue. Missed calls having older time stamps or lower sequence numbers are of higher priority and are placed higher in the appropriate priority level queue. In this manner, priority can be maintained across the entire wireless network, not merely within individual base station coverage areas.

Accordingly, there is provided, for use in a wireless communication network comprising a plurality of base stations capable of communicating with a plurality of mobile devices, an apparatus for maintaining a priority of a missed call from a first mobile device being served by a first base station. In an advantageous embodiment, the apparatus comprises 1) a central controller capable of receiving from a first base station a first message indicating that the first base station is unable to service a pending call from a selected one of the plurality of mobile devices and assigning to the pending missed call a priority indicia; 2) a memory capable of storing the priority indicia; and 3) a priority indicia controller capable of sending the priority indicia to a second base station in response to a receipt from the second base station of a second message indicating that the selected one of the plurality of mobile devices is being serviced by the second base station, wherein the second base station uses the priority indicia to maintain the priority of the pending missed call with respect to at least one pre-existing pending missed calls being serviced by the second base station.

According to one embodiment of the present invention, the central controller is disposed in the first base station.

According to another embodiment of the present invention, the priority indicia controller is disposed in a mobile switching center of the wireless communication network.

According to still another embodiment of the present invention, the memory comprises a plurality of queues, wherein each of the queues is capable of storing call information associated with calls having a similar priority level.

According to yet another embodiment of the present invention, the calls having a similar priority level are serviced by the first base station on a first-come, first-served basis.

According to a further embodiment of the present invention, the plurality of queues comprises an emergency queue for storing priority indicia associated with emergency calls.

According to a still further embodiment of the present invention, the plurality of queues comprises a preferred queue for storing priority indicia associated with calls received from subscribers belonging to a premium class of service.

According to a yet further embodiment of the present invention, the priority indicia comprises a time stamp associated with the pending missed call.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
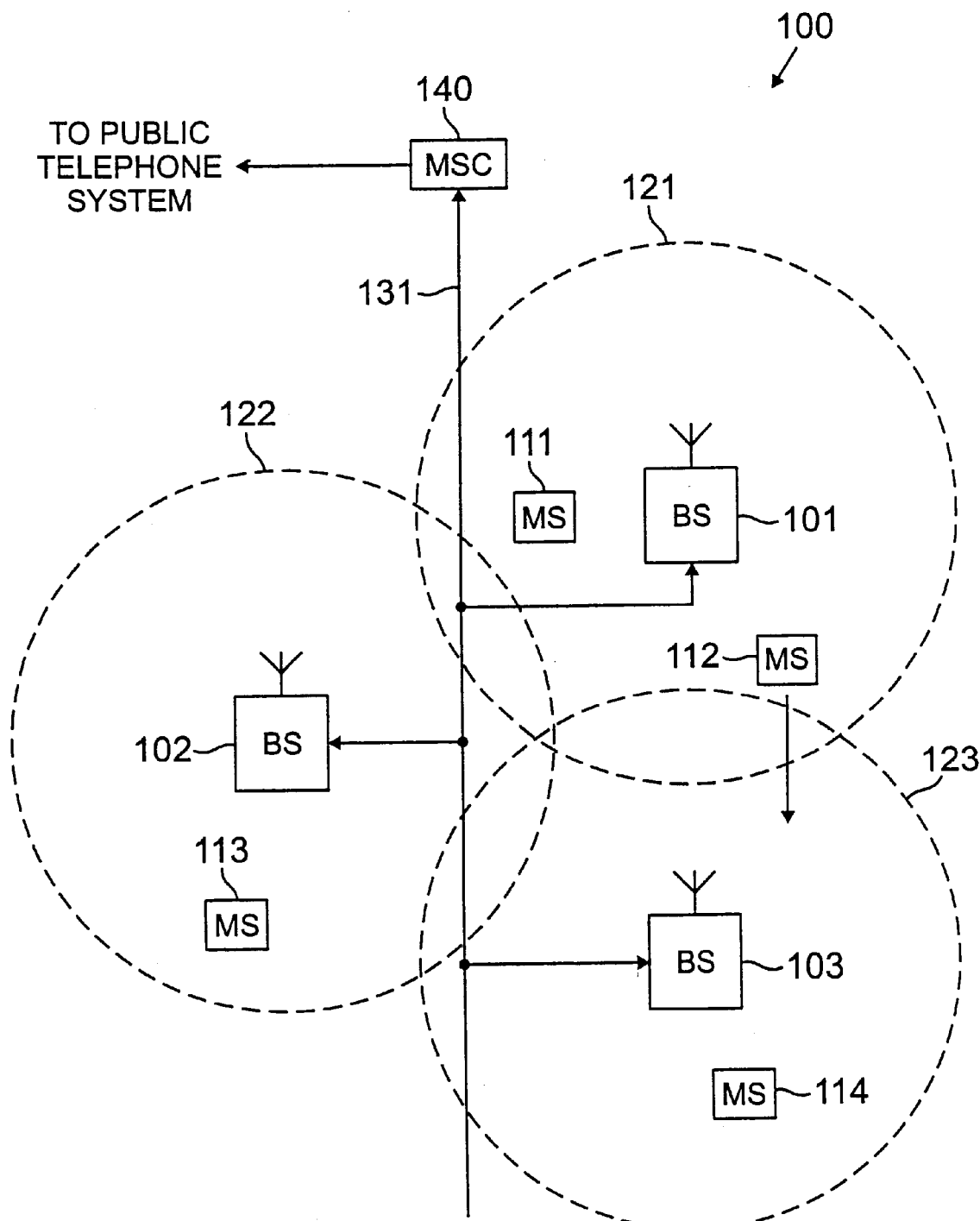
FIG. 1 illustrates an exemplary wireless network according to one embodiment of the present invention.
Figure 2:
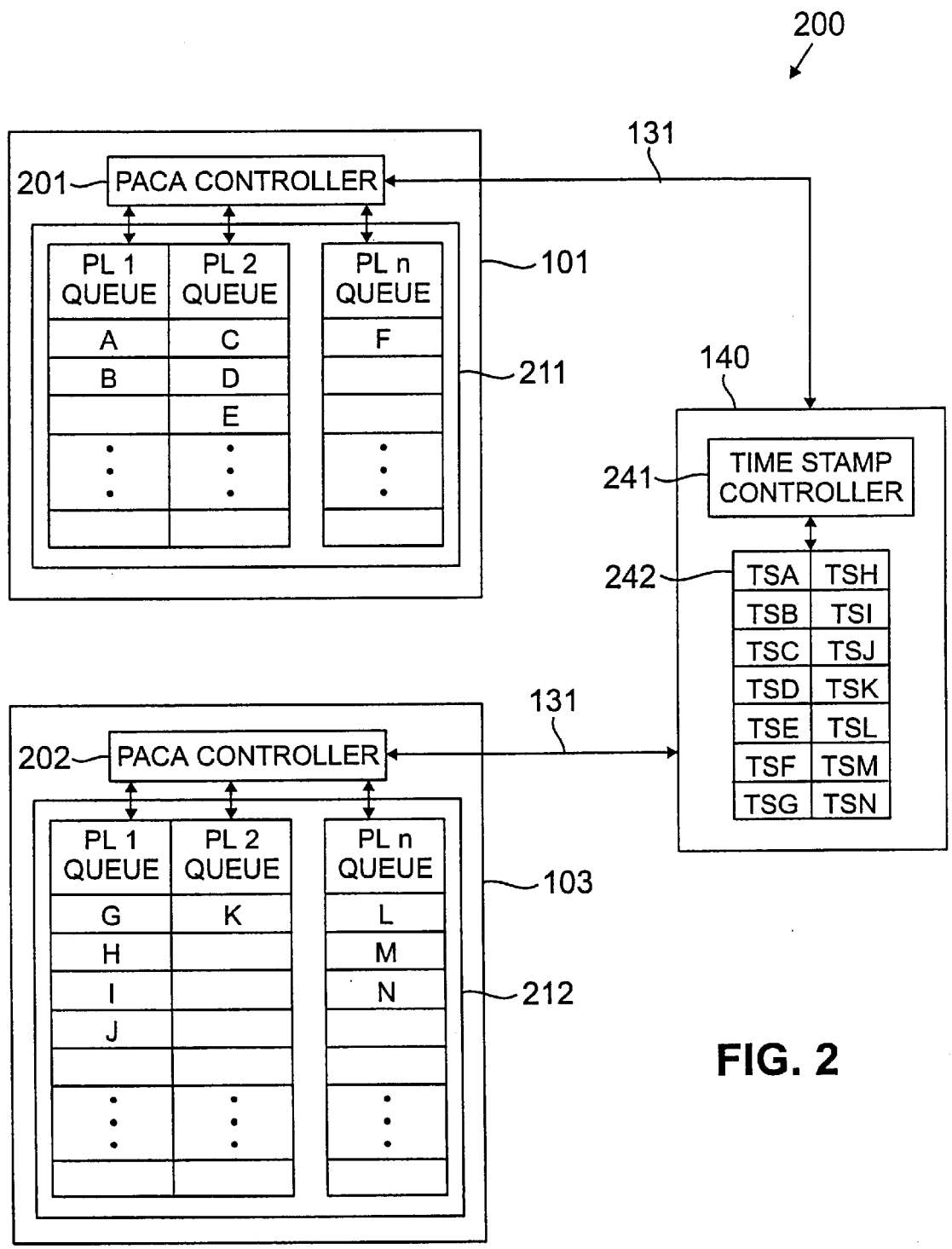
FIG. 2 illustrates a mobile switching center and two base stations in greater detail according to one embodiment of the present invention.
Figure 3:
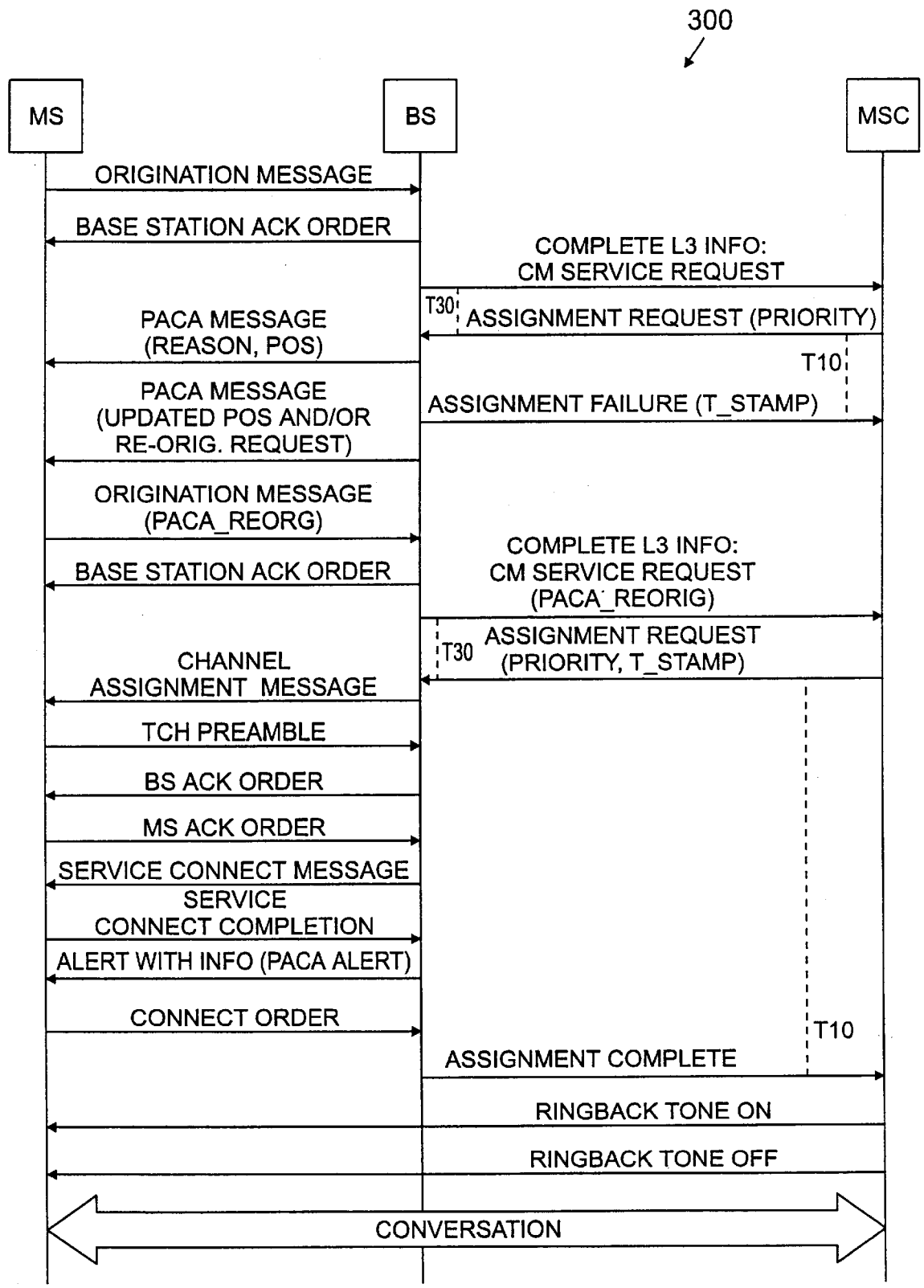
FIG. 3 is a message flow diagram illustrating the operation of a mobile switching center and a base station according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. The wireless telephone network 100 may be any conventional multiple access protocol system, including CDMA, TDMA, or FDMA, among others. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

A "handoff" is a well-known process for transferring control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Each of BS 101, BS 102, and BS 103 has N channels for transmitting and receiving voice and data traffic with MS 111 through MS 114. Additionally, BS 101, BS 102, and BS 103 exchange control messages with MS 111 through MS 114 using one or more dedicated control (or paging) channels. Under heavy traffic conditions, all N voice/data channels of one of BS 101, BS 102 or BS 103, may be in use. If all N channels in a cell are in use, then a new call that is initiated by a mobile station, such as MS 111, MS 112, MS 113 or MS 114, will not be completed by the base station serving the cell. However, each of BS 101, BS 102 and BS 103, is capable of detecting the origination message from the mobile station in the control channel. The base stations can then reserve the next available channel to service the "missed" call from the mobile station. To accomplish this, each of BS 101, BS 102 and BS 103 maintains one or more memory queues for storing call data related to each missed call.

For example, if base station 101 has no available communication channels left and MS 111 and MS 112 initiate calls to BS 101, BS 101 will receive origination messages in its control channel, but will be unable to complete the calls. Instead, BS 101 stores in a missed call queue call information related to the call received from MS 111 and call information related to the call received from MS 112 in order to later reestablish communication with either MS 111 or MS 112, or both, when one or more communication channels again become available.

It is preferred that a priority level be assigned to each missed call in each cell in wireless network 100. For example, a highest priority level may be assigned to calls received from MS 111 through MS 114 that are sent to 911 or other emergency telephone numbers. The next highest priority level may be assigned to missed calls received from "premium" subscribers who pay a higher service fee. A lower priority level may be assigned to missed calls from "regular" subscribers who pay the standard monthly service fee. The missed call queues maintained by BS 101 through BS 103 are therefore subdivided into separate priority level queues that maintain missed call information for missed calls having the same priority level. A time stamp or sequence number is assigned to each missed call in order to enable the missed calls within each priority level queue to be serviced on a first-come, first-served basis thereafter.

FIG. 2 depicts a detailed block diagram 200 of mobile switching center 140, base station 101, and base station 103 according to one embodiment of the present invention. BS 101 comprises priority access channel assignment (PACA) controller 201 and memory queue 211, which is subdivided into 'n' priority level queues, labeled PL1 Queue through PLn Queue. BS 103 comprises priority access channel assignment (PACA) controller 202 and memory queue 212, which is subdivided into 'n' priority level queues, also labeled PL1 Queue through PLn Queue. The priority of a call can be identified either by the calling party number (e.g., customers who are paying higher premium or government emergency officials), by the called party number (e.g., 911), or by dialing a special feature code. When one of BS 101, BS 102, or BS 103 receives a priority call, the base station processes the priority call first, as long as a traffic channel is available. If there is no traffic channel available at the moment the priority call is initiated, the missed priority call is queued in one of PL1 Queue through Pln Queue and waits for the next available traffic channel. As noted above, the missed call is queued according to the priority of the call and, within the same priority, the call is queued on a first come, first served basis.

For example, in BS 101, PL1 Queue contains missed call data for two missed calls, Call A and Call B. Call A and Call B have the same general priority level, namely priority level 1, but Call A was received first. Since it was received first, Call A has a higher priority than Call B on a first-come, first-served basis and is placed at the top of the PL1 Queue. PL2 Queue contains missed call data for three missed calls, Call C, Call D, and Call E. Again, Call C, Call D, and Call E have the same general priority level, namely priority level 2, but Call C was received first. Since it was received first, Call C has a higher priority than either Call D or Call E on a first-come, first-served basis and is placed at the top of the PL2 Queue. Call D appears above Call E since Call D was received before Call E. Finally, PLn Queue contains missed call data for one missed call, Call F.

In BS 103, PL1 Queue contains missed call data for four missed calls which, in order of first come, first served priority, are Call G, Call H, Call I and Call J. PL2 Queue contains missed call data for one missed call, Call K. PLn Queue contains missed call data for three missed calls which, in order of priority, are Call L, Call M, and Call N.

MSC 140 comprises time stamp controller 241 and memory 242 for storing time stamps related to missed calls handled by any base station, including BS 101 and BS 103, that is served by MSC 140. The time stamps, labeled TSA through TSN, are each associated with a corresponding one of Call A through Call N. When a mobile station that has a missed call pending moves from one base station coverage area to another base station coverage area, the missed call data is transferred to the new base station. The present invention uses the time stamp assigned to each missed call to determine the queue position of the missed call in the queues in the new base station. Thus, priority can be maintained on a system wide basis, not merely within individual base station coverage areas.

The operation of MSC 140, BS 101 and BS 103 may best be explained in terms of the control messages exchanged by MSC 140, BS 101 and BS 103 when a call is missed and then re-established. FIG. 3 is a message flow diagram 300 illustrating the operation of a mobile switching center (MSC) and a base station (BS) according to one embodiment of the present invention.

Initially, a mobile station (MS) requests service by transmitting to the base station an Origination Message, with network Layer 2 acknowledgment required, over the access control channel of the air interface. The base station acknowledges receipt of the Origination Message with a Base Station Acknowledgment Order to the mobile station. The base station constructs a CM Service Request Message, places it in a Complete Layer 3 Information Message, sends the formulated message to the base station, and starts a first timer (T10).

The mobile switching center then sends an Assignment Request Message to the base station to request assignment of a traffic channel resource. The Assignment Request Message specifies priority of the call. The mobile switching center then starts a second timer (T303). Upon receipt of the Assignment Request message from the mobile switching center, the base station stops the first timer (T10).

Next, the base station allocates a traffic channel for the call. If, for any reasons, the base station is unable to assign a traffic channel to the call, the base station sends a new Priority Access Channel Assignment (PACA) Message over the paging channel of the RF interface (with the mobile station address) informing the mobile station of the reason for the failure and of the mobile station's current queue position.

The base station sends an Assignment Failure message to the mobile switching center with data regarding the cause of the failure and a PACA time stamp indicating when the missed PACA call was queued. The mobile switching center then maintains the PACA time stamp. Thereafter, the base station periodically transmits a PACA Message on the paging channel informing the mobile station of its current queue position. When a traffic channel element finally becomes available, the base station transmits a PACA message on the paging channel requesting the mobile station to re-originate a PACA call.

The mobile station re-originates the PACA call by sending an Origination Message with the value of the PACA REORIG field set to Logic 1. Additionally, if the mobile station enters the coverage area of another base station and undergoes an idle handoff to the new base station, the mobile station will automatically re-originate the PACA call by sending to the new base station an Origination Message with the value of the PACA REORIG field set to Logic 1.

The base station (including the new base station, if a handoff has occurred) acknowledges the receipt of the Origination Message with a Base Station Acknowledgment Order to the mobile station. The base station constructs a CM Service Request Message with PACA REORIG field set, places the CM Service Request Message in a Complete Layer 3 Information Message, sends the composite message to the mobile switching center, and starts the second timer (T303).

The mobile switching center sends an Assignment Request Message to the base station to request assignment of a traffic channel. The Assignment Request Message specifies the priority of the call and includes the original time stamp. The mobile switching center then starts the first timer (T10). The base station sends a Channel Assignment Message over the paging channel of the RF interface (with the mobile station address) to initiate the establishment of a traffic channel, if the mobile station is not already on a traffic channel. If the base station fails to assign an RF channel, it sends again a PACA message with the reason for the failure and the queue position. The base station uses the time stamp information sent by the mobile switching center to determine the correct queue position. In such a case, the above procedure is repeated and the following steps do not apply.

When the RF channel is assigned, the mobile station begins sending the traffic channel preamble (TCH Preamble) over the designated reverse traffic channel. Once the base station acquires the reverse traffic channel, it sends a Base Station Acknowledgment Order, with Layer 2 Acknowledgment required, to the mobile station over the forward traffic channel. The mobile station acknowledges the reception of the Base Station Acknowledgment Order by transmitting a Mobile Station Acknowledgment Order and by transmitting null traffic channel data (Null TCH Data) over the reverse traffic channel.

The base station then sends a Service Connect Message/ Service Option Response Order to the mobile station specifying the service configuration for the call. The mobile station begins processing traffic in accordance with the specified service configuration. Upon receipt of the Service Connect Message, the mobile station responds with a Service Connect Completion Message.

The base station sends an Alert with Information Message over the forward traffic channel with an appropriate signal for PACA Alert to alert the mobile user about the PACA call. The mobile station rings and the mobile user answers the call. The mobile station then stops ringing and transmits a Connect Order Message over the reverse traffic channel.

When the RF traffic channel and circuit are both established and fully interconnected, the base station sends the Assignment Complete message to the mobile switching center and considers the call to be in Conversation State. The mobile switching center stops the second timer (T10) upon receipt of the Assignment Complete message.

If a call progress tone is applied in-band, a ringback tone is available on the audio circuit path towards the mobile station. When the called party has answered the call, the ringback tone is turned off and two parties enter into conversation.

In alternative embodiments of the present invention, the mobile switching center may use a sequence number controller (rather than a time stamp controller) to assign sequential numbers to missed calls according to the chronological order in which the various base stations send missed call data to the mobile switching center. The mobile switching center transmits the sequence number back to the base station as part of the response to the missed call message first transmitted by the base station. The base station then uses the sequence number to maintain the order of priority within each of its priority level queues. When a mobile station moves into a second base station coverage area and re-originates a call that was missed in a first base station coverage area, the mobile switching center sends the sequence number associated with the missed call to the second base station. Because the sequence numbers are assigned on a system-wide basis, the second base station can use the sequence number to determine the order of priority of the missed call relative to the pre-existing missed calls in the corresponding priority level queue.

Those skilled in the art will recognize that the PACA queues may be maintained at the base station in some embodiment of the invention and in the mobile switching center in other embodiments. The different locations of the PACA queues result in different operational requirements and advantages, as set forth below.

1. PACA queue at the mobile switching center:
   a) Centralized maintenance of the position of the PACA queue.
   b) Periodic messages to the base station from the mobile switching center to update the mobile device as to its current position in queue.
   c) The first PACA message to the mobile device is delayed after the Assignment Failure Message.

d) A new message is needed from the base station to the mobile switching center that notifies the mobile switching center when a traffic channel is available.

e) A new message is need from the mobile switching center to the base station to notify the base station of the queue position of each PACA call.

2) PACA queue at the base station:

a) Localized PACA queue is closer to the mobile device.

b) The timestamp is passed to and maintained at the mobile switching center to maintain priority across the entire network.

c) No periodic messages are needed between the base station and the mobile switching center to update the mobile device as to its current queue position.

Although the present invention has been described in detail, those skilled in the art should understand that they can make various changes, substitutions and alterations herein without departing from the spirit and scope of the invention in its broadest form.

What is claimed is:

1. For use in a wireless communication network comprising a plurality of base stations capable of communicating with a plurality of mobile devices, an apparatus for maintaining a priority of a missed call from a first mobile device being served by a first base station, said apparatus comprising:

a central controller capable of receiving from a first base station a first message indicating that said first base station is unable to service a pending call from a selected one of said plurality of mobile devices and assigning to said pending missed call a priority indicia;

a memory capable of storing said priority indicia;

a priority indicia controller capable of sending said priority indicia to a second base station in response to a receipt from said second base station of a second message indicating that said selected one of said plurality of mobile devices is being serviced by said second base station, wherein said second base station uses said priority indicia to maintain said priority of said pending missed call with respect to at least one pre-existing pending missed calls being serviced by said second base station.

2. The apparatus set forth in claim 1 wherein said central controller is disposed in said first base station.

3. The apparatus set forth in claim 1 wherein said priority indicia controller is disposed in a mobile switching center of said wireless communication network.

4. The apparatus set forth in claim 1 wherein said memory comprises a plurality of queues, wherein each of said queues is capable of storing call information associated with calls having a similar priority level.

5. The apparatus set forth in claim 4 wherein said calls having a similar priority level are serviced by said first base station on a first-come, first-served basis.

6. The apparatus set forth in claim 4 wherein said plurality of queues comprises an emergency queue for storing priority indicia associated with emergency calls.

7. The apparatus set forth in claim 4 wherein said plurality of queues comprises a preferred queue for storing priority indicia associated with calls received from subscribers belonging to a premium class of service.

8. The apparatus set forth in claim 1 wherein said priority indicia comprises a time stamp associated with said pending missed call.

9. A wireless communication network comprising:

a plurality of base stations capable of communicating with a plurality of mobile devices; and an apparatus for maintaining a priority of a missed call from a first mobile device being served by a first base station, said apparatus comprising:

a central controller capable of receiving from a first base station a first message indicating that said first base station is unable to service a pending call from a selected one of said plurality of mobile devices and assigning to said pending missed call a priority indicia;

a memory capable of storing said priority indicia; and a priority indicia controller capable of sending said priority indicia to a second base station in response to a receipt from said second base station of a second message indicating that said selected one of said plurality of mobile devices is being serviced by said second base station, wherein said second base station uses said priority indicia to maintain said priority of said pending missed call with respect to at least one pre-existing pending missed calls being serviced by said second base station.

10. The wireless communication network set forth in claim 9 wherein said central controller is disposed in said first base station.

11. The wireless communication network set forth in claim 9 wherein said priority indicia controller is disposed in a mobile switching center of said wireless communication network.

12. The wireless communication network set forth in claim 9 wherein said memory comprises a plurality of queues, wherein each of said queues is capable of storing call information associated with calls having a similar priority level.

13. The wireless communication network set forth in claim 12 wherein said calls having a similar priority level are serviced by said first base station on a first-come, first-served basis.

14. The wireless communication network set forth in claim 12 wherein said plurality of queues comprises an emergency queue for storing priority indicia associated with emergency calls.

15. The wireless communication network set forth in claim 12 wherein said plurality of queues comprises a preferred queue for storing priority indicia associated with calls received from subscribers belonging to a premium class of service.

16. The wireless communication network set forth in claim 9 wherein said priority indicia comprises a time stamp associated with said pending missed call.

17. For use in a wireless communication network comprising a plurality of base stations capable of communicating with a plurality of mobile devices, a method of maintaining a priority of a missed call from a first mobile device being served by a first base station, the method comprising the steps of:

receiving from a first base station a first message indicating that the first base station is unable to service a pending call from a selected one of the plurality of mobile devices;

assigning to the pending missed call a priority indicia;

storing the priority indicia in a memory;

sending the priority indicia to a second base station in response to a receipt from the second base station of a second message indicating that the selected one of the plurality of mobile devices is being serviced by the second base station, wherein the second base station uses the priority indicia to maintain the priority of the pending missed call with respect to at least one pre-existing pending missed calls being serviced by the second base station.

18. The method set forth in claim 17 wherein the memory comprises a plurality of queues, wherein each of the queues is capable of storing call information associated with calls having a similar priority level.

19. The method set forth in claim 18 wherein the calls having a similar priority level are serviced by the first base station on a first-come, first-served basis.

20. The apparatus set forth in claim 18 wherein the plurality of queues comprises an emergency queue for storing priority indicia associated with emergency calls.

* * * * *